G. W. MacKENZIE, Jr.
LIQUID MEASURING APPARATUS.
APPLICATION FILED OCT. 10, 1916. RENEWED MAR. 18, 1918.
1,297,210.
Patented Mar. 11, 1919.
2 SHEETS—SHEET 1.
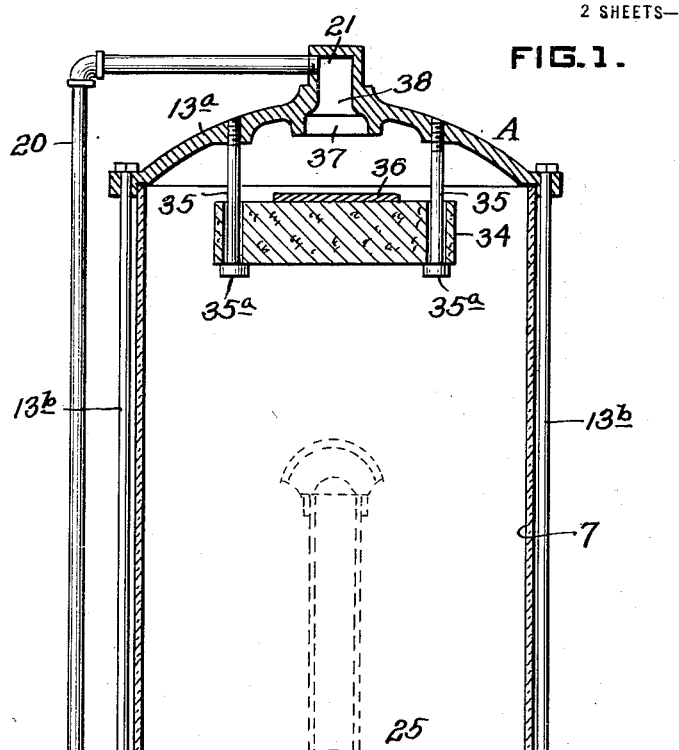
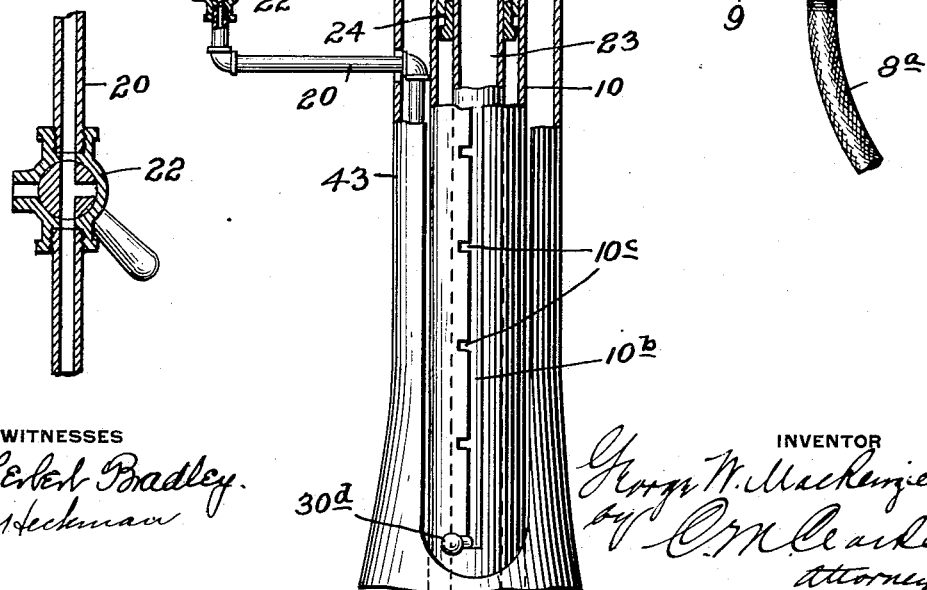

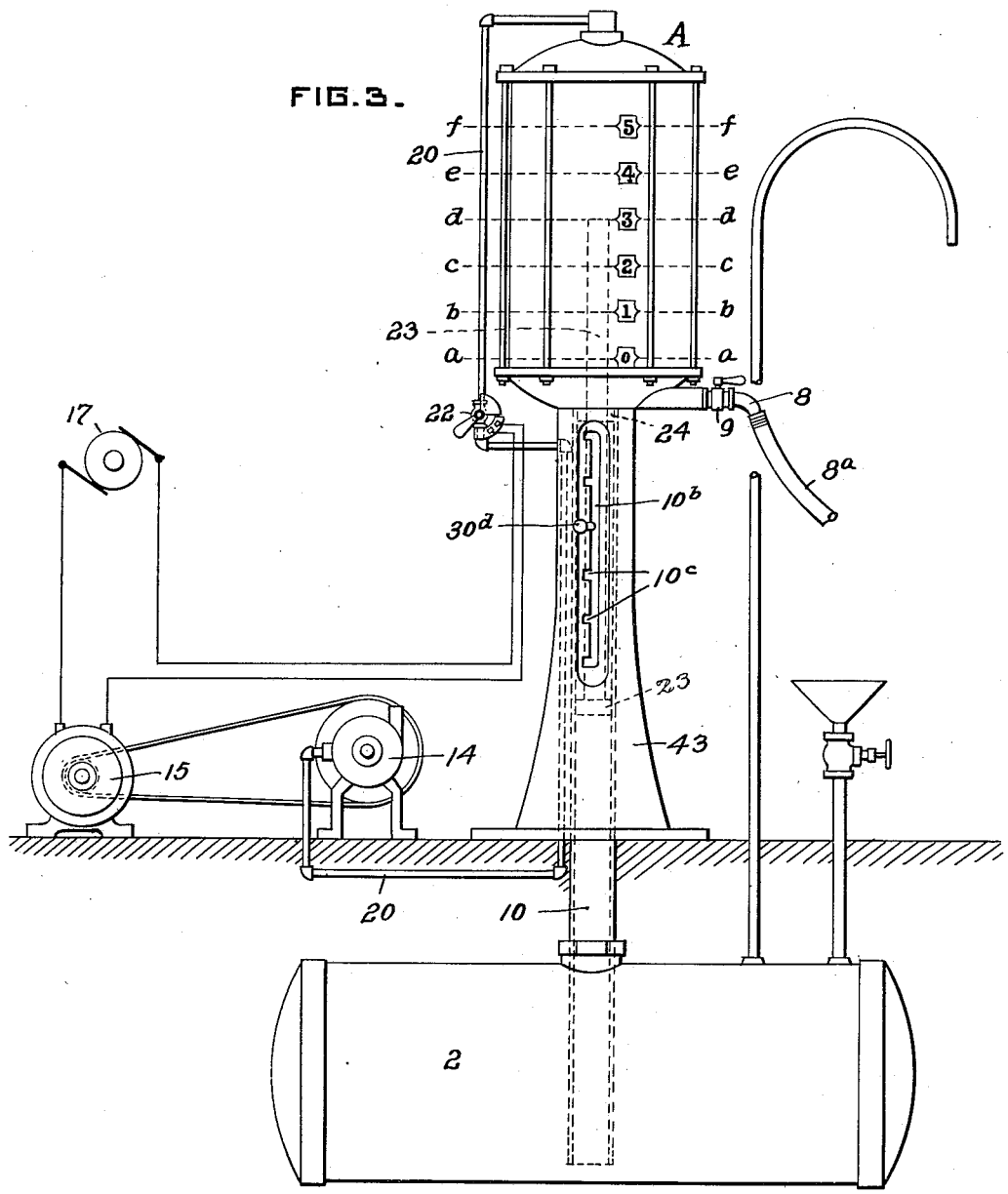

UNITED STATES PATENT OFFICE.

GEORGE W. MACKENZIE, JR., OF ROCHESTER, PENNSYLVANIA, ASSIGNOR TO GUARANTEE LIQUID MEASURE COMPANY, OF ROCHESTER, PENNSYLVANIA, A CORPORATION OF DELAWARE.

LIQUID-MEASURING APPARATUS.

1,297,210.   Specification of Letters Patent.   Patented Mar. 11, 1919.

Application filed October 10, 1916, Serial No. 124,823. Renewed March 18, 1918. Serial No. 223,251.

*To all whom it may concern:*

Be it known that I, GEORGE W. MACKENZIE, Jr., a citizen of the United States, residing at Rochester, in the county of Beaver and State of Pennsylvania, have invented certain new and useful Improvements in Liquid-Measuring Apparatus, of which the following is a specification.

My invention consists of an improvement in apparatus for delivering gasolene or other liquids in measured quantities from a measuring or secondary tank connected with a main reservoir or source of supply at any suitable location, adapted to receive fluid from the main reservoir and to measure the amount to be delivered from the secondary tank to a purchaser or user, as hereinafter described.

The improvement comprised in the present application relates to an adjustable conduit member valve mechanism for controlling out-flow of air from the measuring tank to terminate the operation of a vacuum producing pump or the like, and the connection and coöperation by means of a buoyant float adapted to open and close the air outlet valve, so as to insure termination of the filling of the measuring tank, and prevent fluid from entering the suction pipe.

The present construction is generally similar to that of a companion application, filed herewith, and is a modification of the construction disclosed in a prior application of myself and James A. MacKenzie, filed June 14, 1915, Serial No. 33,897.

Referring to the drawings illustrating the invention,—

Figure 1 is a view in sectional elevation, showing the measuring tank and its several parts in operative relation, the tank being empty.

Fig. 2 is a sectional detail view of the suction controlling valve, showing it in registering position with the air exhausting device.

Fig. 3 is a general view of an entire installation embodying my invention.

Referring to Fig. 1, the secondary or measuring tank A, which, in the preferred construction, is provided with a cylindrical glass body portion, is located at any desired position with relation to a primary or main tank, for delivering fluid to a customer or user through a pipe 8 having a controlling valve 9 and a delivery hose extension $8^a$.

A pipe 10 leads from the bottom portion of the measuring tank A to the main reservoir 2, and is in communication with the interior of the measuring tank A through the central vertically adjustable tube 23 adapted to be set at any desired level by the operator.

The secondary or measuring tank A in the present construction consists of a cylindrical shell 7, preferably of glass, clamped between a base 13 and a top $13^a$ by means of a series of rods $13^b$ and any suitable intervening packing material, whereby to provide an air-tight chamber. The advantage in having the body portion 7 of glass is to insure visibility of the contents.

For the purpose of creating a partial vacuum in the tank A, any suitable air exhausting means may be employed, as a pump 14 of suitable construction having a driving motor 15 actuated by any available power, as a generator 17, and circuit controlling connections similar to those shown in the companion application (Serial No. 124,822).

A suction pipe 20 is connected with the pump and with the upper portion of tank A, as indicated at 21, with an intervening controlling valve 22 adapted to establish suction communication with the pump, as indicated in Fig. 2, and to close such communication and open the interior of the tank to the outside atmosphere, as indicated in Fig. 1.

Conduit 23 is adapted to be raised and lowered, and to be partially rotated by means of an operating trigger or handle $30^d$ which extends outwardly through a vertical slot $10^b$ in conduit 10, having at predetermined positions, off-set slots, or arresting openings $10^c$.

Conduit 23 has a sliding and fluid-tight sealing engagement within the conduit 10 by means of a packed head 24, providing for ample vertical movement of the conduit 23, and preventing flow of the liquid from the interior of tank A into pipe 10.

Conduit 23 is further provided at its lower end with a piston like head 23' which fits snugly within the pipe 10 and prevents any liquid flowing past the lower end of the conduit 23 into the pipe 10.

At its upper end conduit 23 is provided with a splash coping 25 suitably secured to the terminal end of the conduit, and adapted to deflect the rising liquid downwardly to the interior of the measuring tank when valve 22 is open, as indicated in Fig. 2.

A buoyant float 34, which may conveniently be made of cork or other suitable material, in circular disk form, is mounted for limited vertical movement upon guiding rods 35, 35, depending from the top 13$^a$ of the measuring tank A, and engaging terminal heads 35$^a$ of said rods. The central upper portion of said float is provided with a valve facing 36 adapted to seat against a circular downwardly projecting valve seat 37 surrounding the outlet opening 38 leading to suction pipe 20. Upward travel of the float upon the surface of the liquid contents will effect a tight closure of the outlet passage and terminate the suction, should valve 22 be maintained open. Ordinarily, valve 22 is closed to terminate the suction and also the induced flow, when desired.

Delivery pipe 8 communicates through valve 9 with the interior of the measuring tank A, preferably through an upwardly extending shell 42, terminating at any desired level, corresponding to the level within the measuring tank down to which the contents may be quickly drawn off upon reestablishing atmospheric pressure within the tank.

The measuring tank A is supported upwardly above the ground or other foundation upon a tubular supporting shell 43, within the interior of which are conveniently located the suction pipe 20, and the main conduit pipe 10 and adjustable conduit pipe 23.

Column 43 is provided at its front with an elongated opening, as shown in Figs. 1 and 3, providing for clearance of the actuating handle 30$^d$ and its manipulation through slot 10$^b$ and into notches 10$^c$.

For the purpose of providing indicating marks for the different levels within tank A, corresponding to the unitary divisions usually utilized in measuring liquids, and corresponding to any definite unit of measurement, as one gallon each, I provide the several levels a—a, b—b, c—c, d—d, e—e, and f—f, and fix upon the face of the glass cylinder 7 corresponding indicating numerals, as 0, 1, 2, 3, 4 and 5, as indicated in Fig. 3, and which visibly show to the purchaser the exact level to which the liquid rises or falls down to in the measuring tank as controlled by the position of the terminal of conduit 23, before being withdrawn therefrom.

The construction and operation of the device will be readily understood from the foregoing description.

Manipulation of valve 22 will place the conduit 20 in suction communication with the air exhausting device and with the interior of the measuring tank A, whereupon liquid will rise through conduits 10 and 23, passing upwardly against splash coping 25 and escaping laterally through openings therein into the interior.

Handle 30$^d$ having been set at the desired level, as for three gallons thus raising the conduit 23 to a predetermined position, as indicated in dotted lines Figs. 1 and 3, depending upon the amount to be charged into the measuring tank, the effect of the suction will fill the tank up to or slightly above the top of conduit 23. Valve 22 is then closed, opening the upper portion of pipe 20 to the atmosphere and renewing normal atmospheric pressure within the tank, when any surplus will flow backwardly through tube 23, leaving the tank filled to the desired height, whereupon the liquid may then be withdrawn by opening valve 9. In the meantime float valve 34—36 will have fallen by gravity to the position of rest, as shown, if flow of liquid has been sufficient to raise it.

The construction and operation of the invention will be readily understood and appreciated from the foregoing description, and it provides a simple and dependable means for insuring against careless operation of the measuring tank.

Having described my invention, what I claim is:

1. In combination, a measuring tank, a pipe leading from a source of supply to the measuring tank, a vertically movable conduit extending from the measuring tank into said first named pipe and having a sliding connection with the upper end thereof and providing by its upper end a level-defining delivery and return terminal, means for locating said conduit at any predetermined position, means for exhausting the air from the measuring tank, and means for drawing off its contents.

2. In an apparatus of the class described, in combination with a measuring tank having a valve seated air suction outlet and a two-piece telescoping inlet conduit, a vertically movable float within the tank provided with a valve face adapted to engage said valve seated outlet, and guide rods for said float secured to said tank.

3. In combination, a measuring tank, a main reservoir, a telescopically adjustable two-piece conduit providing for supply and return flow between the main reservoir and the measuring tank, and a splash coping on said conduit.

4. In combination, a measuring tank, a main reservoir, and a two-section conduit vertically adjustable relative to said tank providing for supply and return flow between the main reservoir and the measuring tank adapted to be set at a predetermined position to fill the measuring tank to or above its upper terminal and to return any surplus by overflow therethrough back to the main reservoir, said sections being adapted to telescope each other.

5. In combination, a measuring tank, means for producing a vacuum therein, a main reservoir, a conduit vertically adjustable relative to said tank providing for supply and return flow between the main reservoir and the measuring tank, and means for adjusting and locating said conduit at various heights.

6. In combination, a measuring tank having a discharge conduit, a main reservoir, a conduit between the tank and reservoir, said conduit comprising a stationary tubular member between the tank and reservoir and a vertically adjustable tubular member within the stationary member providing for supply and return flow between the main reservoir and the measuring tank, means for effecting a flow of liquid upwardly through said conduit into the measuring tank, and means for adjusting and locating said conduit at various heights.

7. In combination, a measuring tank, a main reservoir, a compound conduit member providing for supply and return flow therethrough between the main reservoir and the measuring tank comprising a fixed member and a relatively adjustable member disposed within said fixed member, and means for adjusting and locking said adjustable member at predetermined levels within said tank.

8. In combination, a measuring tank, a main reservoir, a compound conduit member providing for supply and return flow therethrough between the main reservoir and the measuring tank comprising a fixed member and a relatively adjustable member, and means for adjusting said adjustable member to locate its upper terminal at predetermined levels within said tank.

In testimony whereof I hereunto affix my signature.

GEORGE W. MacKENZIE, Jr.